US007700679B2

(12) United States Patent  
Pieslak et al.

(10) Patent No.: US 7,700,679 B2
(45) Date of Patent: Apr. 20, 2010

(54) HEAT-RECOVERABLE ARTICLE AND COMPOSITION THEREFOR

(75) Inventors: George Pieslak, Atherton, CA (US); Leon C. Glover, Los Altos, CA (US); Tony G. Alvernaz, Bethel Island, CA (US); Jim Imperiale, Fremont, CA (US)

(73) Assignee: Tyco Electronics Corporation, Middletown, PA (US)

( * ) Notice: Subject to any disclaimer, the term of this patent is extended or adjusted under 35 U.S.C. 154(b) by 1012 days.

(21) Appl. No.: 11/350,523

(22) Filed: Feb. 8, 2006

(65) Prior Publication Data

US 2006/0189737 A1 Aug. 24, 2006

Related U.S. Application Data

(60) Provisional application No. 60/654,239, filed on Feb. 18, 2005.

(51) Int. Cl.
*C08K 3/32* (2006.01)
*C08K 3/38* (2006.01)

(52) U.S. Cl. .................. 524/414; 524/272; 524/400; 524/399

(58) Field of Classification Search .......... 524/272, 524/414, 400, 399
See application file for complete search history.

(56) References Cited

U.S. PATENT DOCUMENTS

| | | | |
|---|---|---|---|
| 2,027,962 A | 1/1936 | Currie | 18/55 |
| 3,086,242 A | 4/1963 | Cook et al. | 18/1 |
| 3,597,372 A | 8/1971 | Cook | 260/4 |
| 3,650,856 A | 3/1972 | Artz | 149/19 |
| 3,943,194 A | 3/1976 | Dany et al. | 524/80 |
| 4,067,847 A | 1/1978 | Yui et al. | 260/45.7 R |
| 4,154,718 A | 5/1979 | Miyata et al. | 260/42.14 |
| 4,208,317 A | 6/1980 | Cerny et al. | 260/38 |
| 4,456,654 A | 6/1984 | Kotian | 428/383 |
| 4,471,080 A | 9/1984 | Rinaldi et al. | 523/205 |
| 4,533,687 A | 8/1985 | Itoh et al. | 524/80 |
| 4,560,719 A | 12/1985 | Nakamura et al. | 524/269 |
| 4,698,215 A | 10/1987 | Albanesi et al. | 423/274 |
| 4,879,067 A | 11/1989 | Sakon et al. | 252/609 |
| 5,026,757 A | 6/1991 | Sakon et al. | 524/414 |
| 5,057,367 A | 10/1991 | Morii et al. | 428/389 |
| 5,444,809 A | 8/1995 | Aoki et al. | 385/128 |
| 5,698,323 A | 12/1997 | Keough et al. | 428/379 |
| 6,043,304 A | 3/2000 | Kehal et al. | 524/115 |
| 6,682,801 B2 | 1/2004 | Imahashi et al. | 428/90 |

FOREIGN PATENT DOCUMENTS

| | | |
|---|---|---|
| BE | 817020 | 12/1974 |
| DE | 37 23 980 | 2/1989 |
| EP | 0 064 630 | 2/1985 |
| EP | 0 490 354 | 6/1992 |
| GB | 1536525 | 12/1978 |
| JP | 53-6896 | 1/1978 |
| JP | 54-83939 | 7/1979 |
| JP | 57-92037 | 6/1982 |
| JP | 57-163567 | 10/1982 |
| JP | 59-170176 | 9/1984 |
| JP | 60-13832 | 1/1985 |
| JP | 61-146893 | 7/1986 |
| JP | 61-209241 | 9/1986 |
| JP | 61-213234 | * 9/1986 |
| JP | 61-213235 | 9/1986 |
| JP | 61-291637 | 12/1986 |
| JP | 62-12005 | 1/1987 |
| JP | 62-21704 | 1/1987 |
| JP | 62-53358 | 3/1987 |
| JP | 62-81435 | 4/1987 |
| JP | 62-101644 | 5/1987 |
| JP | 62-215642 | 9/1987 |
| JP | 62-218432 | 9/1987 |
| JP | 62-275138 | 11/1987 |
| JP | 62-275139 | 11/1987 |
| JP | 63-134507 | 6/1988 |
| JP | 63-158712 | 7/1988 |
| JP | 63-159455 | 7/1988 |
| JP | 63-218747 | 9/1988 |
| JP | 64-60642 | 3/1989 |
| JP | 64-74246 | 3/1989 |
| JP | 1-118554 | 5/1989 |
| JP | 1-132645 | 5/1989 |
| JP | 1-230649 | 9/1989 |

(Continued)

OTHER PUBLICATIONS

"Fire-safety Developments", Plastics Compounding, Jul./Aug. 1988, p. 60.
ASTM D2671, Standard Test Methods for Heat-Shrinkable Tubing for Electrical Use.
ASTM D2863, Standard Test Method for Measuring the Minimum Oxygen Concentration to Support Candle-like Combustion of Plastics (Oxygen Index).
ASTM E662, Standard Test Method of Specific Optical Density of Smoke Generated by Solid Materials.
Patent Abstracts of Japan, vol. 007, No. 209 (C-186), Sep. 14, 1983 & Japanese Patent Publication No. 58 109546A (Fujikura Densen KK), Jun. 29, 1983 (abstract and application).

(Continued)

*Primary Examiner*—Ling-Siu Choi

(57) ABSTRACT

A non-halogenated heat-recoverable article which passes the UL Standard for Safety for Extruded Insulating Tubing, UL 224, Fifth Edition, VW-1 flame test is prepared from a composition which contains polyethylene or an ethylene copolymer or a mixture, a hydrated or carbonated inorganic filler, red amorphous phosphorus, and an inorganic filler such as zinc borate. The article has good physical properties as measured by tensile strength and elongation, and good high temperature performance. A particularly useful article is heat-recoverable tubing which has good flame-retardancy as demonstrated by the VW-1 test.

14 Claims, 1 Drawing Sheet

FOREIGN PATENT DOCUMENTS

| | | |
|---|---|---|
| JP | 2-80448 | 3/1990 |
| JP | 2-155939 | 6/1990 |
| JP | 2-158640 | 6/1990 |
| JP | 2-189809 | 7/1990 |
| JP | 2-247224 | 10/1990 |
| JP | 2-257105 | 10/1990 |
| JP | 5-163387 | 6/1993 |
| JP | 6-322276 | 11/1994 |

OTHER PUBLICATIONS

Patent Abstracts of Japan, vol. 016, No. 033 (C-0905), Jan. 28, 1992 & Japanese Patent Publication No. 03 244643A (Furukawa Electric Co. Ltd), Oct. 31, 1991 (abstract only).

Patent Abstracts of Japan, vol. 2000, No. 17, Jun. 5, 2001 & Japanese Publication No. JP 06 071752A (Raychem Corporation), Mar. 15, 1994 (abstract only).

SAE Aerospace Material Specification SAE-AMS-DTL-23053/5, "Insulation Sleeving, Electrical, Heat Shrinkable, Polyolefin, Flexible, Crosslinked", FSC 5970, Jul. 1999, pp. 1-8.

Underwriters' Laboratories Standard for Extruded Insulating Tubing, UL 224, Fourth Edition, Jan. 2, 1992, All-Tubing Flame Test, pp. 17-21.

Underwriters' Laboratories Standard for Extruded Insulating Tubing, UL 224, Fourth Edition, Jan. 2, 1992, Optional VW-1 (Vertical Wire) Flame Test, pp. 21-24.

Underwriters' Laboratories UL Standard for Safety for Extruded Insulating Tubing, UL 224, Fifth Edition, Dec. 15, 1999. (UL 224 Specification for Extruded Insulating Tubing rated to 125° C., Fifth Edition, Dec. 15, 1999. See sections 6.9 (Flame Test—All Tubing (pp. 23-25)) and 6.10 (Optional VW-1 (Vertical Wire) Flame Test (pp. 25-27.)).

Japanese Patent Publication No. 58-109546 (Fujikura Cable Works KK), Jun. 29, 1983.

International Search Report for International Application No. PCT/US2006/004584, mailed Jun. 19, 2006.

* cited by examiner

FIGURE
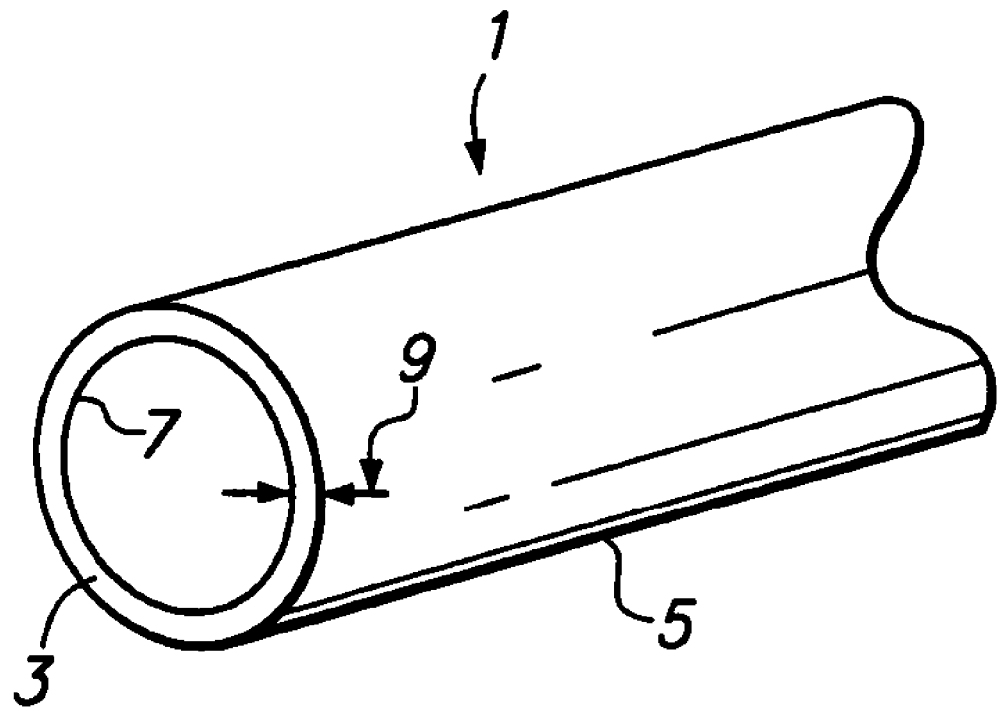

HEAT-RECOVERABLE ARTICLE AND COMPOSITION THEREFOR

CROSS-REFERENCE TO RELATED APPLICATIONS

This application is an application under 35 USC 111(a) and claims priority under 35 USC 119 from Provisional Application Ser. No. 60/654,239, filed Feb. 18, 2005 under 35 USC 111(b). The disclosure of that provisional application is incorporated herein by reference.

BACKGROUND OF THE INVENTION

1. Field of the Invention

This invention relates to dimensionally recoverable articles, particularly heat-recoverable articles, and to compositions suitable for making such articles.

2. Introduction to the Invention

Dimensionally recoverable articles such as heat-recoverable tubing are well-known. Such articles are often used to provide electrical and environmental insulation over spliced wires or to protect areas of cables where there are breaks in the insulation. To provide adequate recoverability and flexibility, the articles generally comprise polymers. For many applications it is necessary that the polymer be flame-retarded in order to minimize the risk of damage in the event of a fire. Such flame-retardancy may be achieved either by the use of a halogen-containing polymer, e.g. a fluoropolymer, or by the addition of a halogenated material, e.g. a brominated or chlorinated compound such as decabromodiphenylether (DB-DPE), to a non-halogenated polymer, e.g. polyolefins such as polyethylene or ethylene copolymers. Polymeric compounds with such flame retardancy are useful as they self-extinguish when removed from flame. However, they do have disadvantages, as they can undergo continuous combustion to produce a large quantity of smoke, or they can thermally decompose, releasing corrosive gases, e.g. halogen acids, which can be detrimental to personnel or sensitive electronic equipment.

Attempts have been made to incorporate halogen-free flame-retardants into polyolefin resins to overcome the above disadvantages. Halogen-free flame-retardants such as alumina trihydrate (ATH) must be used in relatively large concentration in order to give fully useful flame-retardancy to the resulting compositions. However, when a large concentration of halogen-free flame-retardant is added to a polyolefin resin, the resulting resin composition, when extruded, exhibits reduced physical properties, especially in tensile strength and elongation, and also greatly reduced aging and electrical properties. In addition, these compositions are difficult to extrude and expand into tubing, especially thin wall tubing.

When the composition is used in the form of tubing, a number of product-related flame tests are conducted. Of particular importance is the Underwriters' Laboratories UL Standard for Safety for Extruded Insulating Tubing, UL 224, Fifth Edition, Dec. 15, 1999 (referred to hereinafter as the Fifth Edition VW-1 Flame Test), the disclosure of which is incorporated herein by reference. UL 224 contains several different aspects, including measurements of the physical properties, i.e. tensile strength and elongation, and a measurement of the performance of the tubing when exposed to a flame, i.e. the VW-1 (Vertical Wire) flame test. In this test, the tubing is recovered and is then supported by steel music wire while five applications of flame are made. To pass the test, the tubing must not flame or glow more than sixty seconds following any of the five flame applications.

There are a number of issues associated with the VW-1 flame test. First, the lack of a heat sink, as provided by a metal mandrel in other tests, means that the polymer gets hotter, increasing the chances of flaming and making the test difficult to pass. Second, under the provisions of the Fifth Edition test, the UL chamber used for testing has been redesigned; it is much larger and is completely sealed, limiting any drafts in the chamber and making the test more difficult to pass than in older versions of the test. In the test version using the former chamber, provisions were made to allow a draft to be present as long as there was no effect on the character of the applied flame. The draft served to remove any smoke that was generated during the test, but also assisted in damping some types of sputtering flames that might be generated on the polymer. In the Fifth Edition test, the sealed chamber ensures that any sputtering flame on the polymer will not be extinguished. Therefore, products that may have passed the VW-1 test using the older chamber now may have difficulties in passing. Third, it is desirable that tubing made from the same composition should pass the test for a variety of different wall thicknesses and inner diameter values. However, while very large tubing (i.e. tubing having an inner diameter greater than 10 mm) usually passes, as the volume of polymer present makes it difficult to heat sufficiently to flame or glow, and very small tubing (i.e. tubing having an inner diameter less than 2 mm) usually passes, as it is overwhelmed by the heat and burns quickly, intermediate size tubing, i.e. tubing with an inner diameter of 3 to 9 mm often does not pass the test. This is due to the construction of these intermediate sizes, the wall thickness, and the concentration of the flame retardant in the polymer wall.

It is also desirable that the tubing have adequate performance for continuous use at elevated temperature, i.e. at 125° C. Such high temperature performance is particularly important when the tubing is used for automotive applications.

Non-halogen-containing tubing made from a polyethylene-based polymeric composition in which the flame retardant comprises a mixture of a hydrated or carbonated inorganic filler and red amorphous phosphorus is known. While such tubing may have acceptable physical properties, not all sizes of such tubing are able to pass the Fifth Edition VW-1 test, making it unsuitable for applications, including automotive applications, that require passage of such a test. It is therefore, desirable to have a composition for use in heat-recoverable articles such as tubing that exhibits good high temperature performance, has good physical properties, and has the ability to pass the Fifth Edition VW-1 test across a range of sizes. An example of conventional non-halogenated tubing is MTZH™ tubing, available from Tyco Electronics Corporation.

BRIEF SUMMARY OF THE INVENTION

In a first aspect, this invention provides a heat-recoverable article which passes a UL VW-1 flame test as defined in UL Standard for Safety for Extruded Insulating Tubing, UL 224, Fifth Edition, Dec. 15, 1999 and which comprises a polymeric composition which comprises (a) 44 to 59% by weight of an ethylene copolymer comprising ethylene methyl acrylate,
(b) 26 to 42% by weight of a first inorganic filler which comprises magnesium hydroxide,
(c) 1 to 5% by weight red amorphous phosphorus, and
(d) 1 to 9% by weight of a second inorganic filler which comprises zinc borate said article
(1) having a tensile strength at 25° C. when recovered of at least 1500 psi; and (2) having an elongation to break at 25° C. when recovered of at least 200%.

In a second aspect, this invention provides a non-halogenated heat-recoverable article which (1) comprises a polymeric composition which comprises
  (a) 44 to 59% by weight of an ethylene copolymer comprising ethylene methyl acrylate,
  (b) 26 to 42% by weight of a first inorganic filler which comprises magnesium hydroxide,
  (c) 1 to 5% by weight red amorphous phosphorus, and
  (d) 1 to 9% by weight of a second inorganic filler which comprises a borate;
(2) passes the UL VW-1 flame test as defined in UL Standard for Safety for Extruded Insulating Tubing, UL 224, Fifth Edition, Dec. 15, 1999;
(3) has a tensile strength at 25° C. of at least 1500 psi when recovered;
(4) has an elongation to break at 25° C. of at least 200% when recovered;
(5) is in the form of a tube which has a wall thickness of at most 1 mm (0.040 inch) when recovered.

BRIEF DESCRIPTION OF THE DRAWING

The invention is illustrated by the drawing in which the FIGURE shows a perspective view of a heat-recoverable article of the invention in the recovered state.

DETAILED DESCRIPTION OF THE INVENTION

The polymeric compositions of the invention comprise a polymer which is an ethylene polymer. In this specification, the term ethylene polymer is used to mean any polymer which comprises at least 30 molar % —$(CH_2)$— units. Therefore, the ethylene polymer comprises polyethylene, an ethylene copolymer or a mixture of two or more of these polymers with other ethylene polymers or copolymers. In addition, the ethylene polymer or copolymer can be mixed with other types of polymers, e.g. a rubber or amorphous polymer. Polymers which are useful in the invention include polyethylene, e.g. very low density polyethylene, low density polyethylene, linear low density polyethylene, medium density polyethylene, or high density polyethylene, and ethylene copolymers such as ethylene/vinyl acetate copolymer, ethylene/ethyl acrylate copolymer, ethylene/methyl acrylate copolymer, and ethylene butyl acrylate copolymer. If the polymer is an ethylene copolymer, the amount of the nonethylene component is selected based on the specific type of application and the desired physical properties. Thus, for an ethylene/vinyl acetate copolymer, the vinyl acetate content can be from less than 8% to more than 25%, and for an ethylene/methyl acrylate, the methyl acrylate content can be from less than 15% to more than 25%. In general, the polymer comprises 44 to 59%, preferably 46 to 55%, particularly 35 to 50% by weight of the total composition, although the exact amount of polymeric component is dependent on the type, particle size, and amount of the inorganic filler and any other fillers. Particularly preferred are compositions in which the polymer comprises ethylene/methyl acrylate copolymer as the sole polymeric component.

The composition comprises a first inorganic filler, preferably a metal or metal oxide of Group IIa or IIIa which is hydrated or carbonated. Preferred fillers include magnesium hydroxide, magnesium carbonate, calcium carbonate, and alumina trihydrate. The first inorganic filler can be a single material or a mixture. The filler is present in the composition at 26 to 42% by weight of the total composition, preferably at 30 to 40% by weight. For some applications, it is desirable to coat the first inorganic filler with a process aid or dispersing agent, e.g. a silane, a fatty acid, or a stearate. In order to achieve good physical properties, it is preferred that the average particle size of the first inorganic filler be less than 12 µm, preferably less than 10 µm, particularly less than 8 µm, especially less than 6 µm, more especially less than 4 µm, e.g. 0.5 to 3 µm. Particularly preferred are compositions in which the first organic filler comprises magnesium hydroxide.

The composition preferably also comprises a second inorganic filler, preferably a borate, e.g. zinc borate or barium meta-borate. This second inorganic filler is present at 0 to 9% by weight of the composition, preferably at 1 to 9% by weight, particularly at 2 to 6% by weight. It is preferred that the average particle size of the second inorganic filler be less than 10 µm.

Red amorphous phosphorus is present in the composition at 1 to 5% by weight of the total composition, preferably 2 to 5% by weight, particularly 3 to 5% by weight. In general, lower loadings of red phosphorus are needed with polar polymers, e.g. ethylene copolymers, than with nonpolar polymers, e.g. low density polyethylene. In order to avoid excessive smoke generation, the red phosphorus content should be as low as possible, generally less than 10% by weight of the total composition. While it is possible to use red phosphorus in an unmodified condition, for ease of handling, mixing and dispersion it is often preferred that the red phosphorus be dispersed in a polymer, e.g. low density polyethylene or ethylene/vinyl acetate copolymer. In addition or as an alternative, the red phosphorus can be pre-coated, prior to dispersion in the composition, with an epoxy or another processing aid. For many compositions of the invention, in order to achieve good physical properties, it is preferred that red phosphorus with an average particle size of less than 50 µm, particularly less than 30 µm, especially less than 20 µm, more especially less than 10 µm, be used. The red phosphorus appears to act synergistically with the inorganic filler to provide a material with a higher limiting oxygen index value than would be anticipated based on normal additive effects. The synergistic effect is most pronounced for compositions in which the inorganic filler is magnesium hydroxide, magnesium carbonate, or calcium carbonate.

In addition to the inorganic filler and the red phosphorus, compositions of the invention often contain one or more additives or fillers in an amount up to about 25% by weight of the total composition, preferably about 0.5 to about 20% by weight, particularly about 5 to about 20% by weight. Additives can include, for example, antioxidants, ultraviolet stabilizers, crosslinking agents as promoters (also called pro-rads), processing aids, and pigments. For some compositions, additional conventional flame retardants and/or smoke suppressants may also be used.

The composition of the invention is one which, when prepared in the form of a standard heat-recoverable tube, is capable of passing the Underwriters' Laboratory UL VW-1 Flame Test, Fifth Edition, as described in greater detail below. For purposes of this specification, a standard heat-recoverable tube is one which, in its extruded, but unexpanded condition, has a nominal inside diameter (ID) of 2.1 mm (0.083 inch) and a nominal wall thickness of 0.5 mm (0.019 inch). On expansion, the standard heat-recoverable tube has an ID of 4.8 mm (0.188 inch)

Preferably the polymeric composition has a specific gravity of less than about 1.35. Such requirements are specified in certain military specifications such as SAE-AMS-DTL-23053/5, Class 1 and 3, the disclosure of which is incorporated herein by reference. The use of red phosphorus allows the composition to contain less total inorganic filler, thus producing a lighter-weight, more flexible material.

Compositions of the invention are suitable for use in a variety of applications, e.g. as tubing, as jacketing for wire and cable, or in molded parts. Particularly suitable applications are those in which the cross-section of the article comprising the composition, e.g. the thickness of the polymer jacket on a cable or the wall thickness on tubing, is relatively thin, i.e. less than 1 mm (0.040 inch), preferably less than 0.9 mm (0.035 inch), particularly less than 0.8 mm (0.030 inch), and often much less, e.g. 0.51 mm (0.020 inch). For many applications, the article is in the form of a tubular article, preferably heat-recoverable tubing. When the article is heat-recoverable, the thickness of the wall is measured after the article has been recovered.

Heat-recoverable articles are articles, the dimensional configuration of which may be made substantially to change when subjected to heat treatment. Usually these articles recover, on heating, toward an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No. 3,597,372 (Cook), the disclosures of which are incorporated herein by reference. As is made clear, for example, in U.S. Pat. No. 2,027,962, the original dimensionally heat-stable form may be a transient form in a continuous process in which, for example, an extruded tube is expanded, while hot, to a dimensionally heat-unstable form, but in other applications, a preformed dimensionally heat-stable article is deformed to a dimensionally heat-unstable form in a separate stage.

In the production of heat-recoverable articles, the polymeric material may be crosslinked at any stage in the production of the article that will enhance the desired dimensional recoverability. One method of producing a heat-recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

The crosslinking can be effected by chemical means, e.g. with peroxides, or by irradiation or a combination of the two. Radiation employed can be of various types, including charged particles, e.g. alpha particles or high energy electrons, electromagnetic radiation, e.g. gamma radiation or ultraviolet radiation. Any amount of radiation can be used, although generally a dosage of from 1 to 50 Mrads, preferably 2 to 20 Mrads, will be sufficient.

The heat-recoverable articles of the invention generally have a tensile strength at room temperature (assumed to be 25° C. in this specification), as measured by ASTM D2671, of at least 1500 psi (10.34 MPa), preferably at least 1600 psi (11.03 MPa), particularly at least 1700 psi (11.72 MPa), especially at least 1800 psi (12.41 MPa). The ultimate elongation (i.e. elongation to break) at room temperature as measured by ASTM D2671 for the articles of the invention is at least 200%, preferably at least 300%, particularly at least 400%. In this specification, all tensile strength and percent elongation numbers are measured on heat-recoverable articles or samples which have been recovered.

The Figure shows a perspective view of a heat-recoverable article 1 of the invention in the recovered state. Article 1, which is in the form of tubing, has wall 3 that lies between outer wall surface 5 and inner wall surface 7, and has a wall thickness 9.

The invention is illustrated by the following examples, in which Examples 1 to 6, 10, and 11 are comparative examples. In particular, Example 6 is an example of conventional tubing referred.

Preparation of the Tubing

The components for each example as set forth in Table I were mixed in a Banbury mixer, mixed for 3 minutes, and then pelletized. The pellets were extruded using a 51 mm (2 inch) extruder to produce two types of tubing. The first type of tubing, designated "thin wall", was produced using a die having an inner diameter of 2.87 mm (0.113 inch) to provide tubing having an extruded outer diameter of 2.31 mm (0.091 inch), an extruded inner diameter of 1.75 mm (0.069 inch), and a wall thickness of 0.28 mm (0.011 inch). The tubing was irradiated 12-16 Mrads using a 1.5 MeV electron beam. The irradiated tubing was then expanded at 116° C. (240° F.) to give tubing with an expanded outer diameter of 4.82 mm (0.190 inch) and expanded inner diameter of 4.39 mm (0.173 inch). When recovered, the thin wall tubing had a wall thickness of 0.31 mm (0.012 inch).

The second type of tubing, designated "standard wall", used a die having an inner diameter of 4.3 mm (0.170 inch) to produce tubing having an extruded outer diameter of 2.77 mm (0.109 inch), an extruded inner diameter of 1.80 mm (0.071 inch), and a wall thickness of 0.48 mm (0.019 inch). Following irradiation and expansion as with the thin wall tubing, the standard wall tubing had an expanded outer diameter of 5.89 mm (0.232 inch) and an expanded inner diameter of 5.21 mm (0.205 inch). When recovered the standard wall tubing had a wall thickness of 0.51 mm (0.020 inch).

Testing of the Tubing

Tensile and Elongation Testing: The tensile and elongation tests were performed on a recovered tubing samples according to the ASTM D 2671 test procedure in an Instron Tester, Model 1122, at 23±2° C. with a cross head speed of 0.51 m/min (20 inches/min), 25.4 mm (1 inch) bench marks and an initial 51 mm (2 inch) jaw separation. The cross sectional area (CSA) of the tubing was calculated using the dimensions of the tubing, which were measured with a micrometer. The tensile strength was calculated by dividing the force at break by CSA. A minimum of five samples were tested for each composition. An average tensile strength of 1,500 psi was required to pass the test. An average elongation of 200% was required to pass.

VW-1 Flame Test: The flame test was performed according to UL 224 Specification for Extruded Insulating Tubing rated to 125° C., Fifth Edition, Dec. 15, 1999, pages 25-27. This test was performed in a completely sealed, draft free enclosure inside of a hood, the enclosure having dimensions of 0.30 m wide×0.36 m deep×0.61 m high (12×14×24 inches). Tubing samples 0.66 m (26 inches) long were recovered onto 0.89 m (35 inches) of fine spring steel music wire and were suspended vertically in the enclosure using this steel wire, leaving 0.56 m (22 inches) of the sample exposed for testing. The diameter of the steel wire was selected based on the inner diameter of the recovered tubing, and was 0.74 mm (0.029 inch) diameter for tubing with inner diameter of at least 0.81 mm (0.032 inch); 0.41 mm (0.016 inch) diameter for tubing with inner diameter of 0.48 to 0.81 mm (0.019 to 0.032 inch); and 0.25 mm (0.010 inch) diameter for tubing with inner diameter less than 0.48 mm (0.019 inch).

The flame was applied from a Tirril gas burner having a barrel extending 100 mm (4 inches) above the air inlets, and an inside diameter of the barrel of 9.5 mm (0.375 inch). The overall height of the flame was adjusted to approximately 125 mm (5 inches) and the inner blue cone of the flame was 40 mm (1.5 inches). The temperature rise of the flame from 100° C. to 700° C. was 54±2 seconds when using a copper slug and a thermocouple. Calibration of the burner was performed according to UL 1581 specification. The burner was secured on a wedge, which allowed the burner to be tilted 20° from the vertical. The wedge with the burner was positioned in such a way that the burner was 38 mm (1.5 inch) away from the sample and the tip of the blue flame touched the center of the sample. The flame was applied by opening and closing of a gas valve for 15 seconds. Five applications of flame were performed and the time between applications was 15 seconds or longer if flame or glow was still present at the end of the first 15 seconds. The flame and glow could not exceed 60 seconds on any of the five applications, or the test was considered to be a failure.

In order to make sure that the sample would not ignite other materials in the vicinity, a layer of untreated surgical cotton approximately 3.2 mm (0.125 inch) thick was placed on the floor of the enclosure and around the wedge. Also, to make certain that the flame of the burning sample was not too vigorous; a paper flag was attached at the top of the sample. This flag was made from gummed kraft paper, 12.7 mm wide×19.1 mm long (0.5 inch×0.75 inch), and was attached about 0.25 m (10 inches) above the point at which flame was to be applied, facing the back of the enclosure. If the samples burned and ignited the flag, the test was considered to be a failure if more than 25% of the flag was burned. Also, if the flaming debris, which dropped from the sample, ignited the cotton, the test was considered to be a failure. UL Labs tests three samples and if one sample fails, the test is considered a failure. In the results reported below, either 10 or 25 samples were tested, and if 92% passed, the product was considered to pass.

Notes from Table I:

EVA is Elvax™ 3190 LG ethylene/vinyl acetate copolymer, available from DuPont Chemical Co., having a vinyl acetate content of 25%.

EMA is Optema™ TC 115 ethylene/methyl acrylate copolymer, available from Exxon Mobil, having a methyl acrylate content of 15%.

$Mg(OH)_2$ is Kisuma™ 5B magnesium hydroxide, available from Kyowa Chemical Industries, having an average particle size of 1 μm.

$ZnBO_4$ is Firebrake™ ZB zinc borate, available from U.S. Borax, having an average particle size of 7 μm.

RP1 is Exolit™ RP 692, a mixture of 50% by weight red phosphorus in low density polyethylene, available from Clariant.

RP2 is Masteret™ 10460 B2XF-T, a mixture of 60% by weight red phosphorus having an average particle size of about 10 μm in low density polyethylene, available from Italmatch.

RP3 is Masteret™ 40460 B2XF, a mixture of 60% by weight red phosphorus having an average particle size of about 10 μm in ethylene/vinyl acetate copolymer, available from Italmatch.

Additives include antioxidants, pigments, silicone process aid, zinc stearate, fumed silica, a fungicide, and a crosslinking enhancer.

TABLE II

Results of Testing

| | Thin Wall | | | Standard Wall | | |
|---|---|---|---|---|---|---|
| Example | Tensile (psi) | Elongation (%) | VW-1 (# test/ #pass) | Tensile (psi) | Elongation (%) | VW-1 (# test/ #pass) |
| 1* | — | — | — | 1890 | 320 | 0/5 |
| 2* | — | — | — | 1820 | 440 | 0/3 |
| 3* | — | — | — | 1430 | 340 | 19/20 |
| 4* | 1270 | 360 | 10/10 | 1430 | 380 | 10/10 |
| 5* | — | — | 10/10 | 1580 | 370 | 23/25 |
| 6* | 1390 | 400 | 2/5 | 1420 | 440 | 9/10 |
| 7 | 1530 | 420 | 10/10 | 1640 | 400 | 10/10 |
| 8 | 2000 | 460 | 20/20 | 2070 | 470 | 10/10 |
| 9 | 1710 | 410 | 10/10 | 1670 | 420 | 10/10 |
| 10* | 1770 | 410 | 22/25 | 1710 | 400 | 10/10 |
| 11* | 1900 | 430 | 16/25 | 1870 | 410 | 10/10 |
| 12 | 1700 | 410 | 10/10 | 1770 | 480 | 24/25 |
| 13 | 1960 | 450 | 10/10 | 1880 | 450 | 24/25 |
| 14 | 1880 | 430 | 10/10 | 1920 | 460 | 24/25 |

TABLE I (Formulations in Weight Percent of Total Composition)

| | Example | | | | | | | | | | | | | | | |
|---|---|---|---|---|---|---|---|---|---|---|---|---|---|---|---|---|
| | 1* | 2* | 3* | 4* | 5* | 6* | 7 | 8 | 9 | 10* | 11* | 12 | 13 | 14 | 15 | 16 |
| EVA | 41.3 | 41.7 | | | | | | | | | | | | | | |
| EMA | | | 41.0 | 41.7 | 41.7 | 40.9 | 46.0 | 50.0 | 50.0 | 50.0 | 50.0 | 50.0 | 53.0 | 53.0 | 56.0 | 56.0 |
| $Mg(OH)_2$ | 42.0 | 42.0 | 42.0 | 37.7 | 42.0 | 42.01 | 38.7 | 30.0 | 31.6 | 33.3 | 34.7 | 26.1 | 28.9 | 27.4 | 26.2 | 24.7 |
| $ZnBO_4$ | 4.3 | 4.3 | 4.3 | 8.6 | 4.3 | 4.31 | | 4.0 | 4.0 | 4.0 | | 8.6 | 3.7 | 3.6 | 3.4 | 3.6 |
| RP1 | 4.0 | | 4.0 | | | | | | | | | | | | | |
| RP2 | | 3.3 | | 3.3 | 3.3 | | 6.6 | | | | | | | | | |
| RP3 | | | | | | 3.3 | | 6.6 | 5.0 | 3.3 | 6.6 | 6.6 | 5.0 | 6.6 | 5.0 | 6.6 |
| Additive | 8.2 | 9.1 | 8.7 | 8.7 | 8.7 | 9.48 | 8.7 | 9.4 | 9.4 | 9.4 | 8.4 | 8.4 | 9.4 | 9.4 | 9.4 | 9.4 |

*Comparative Examples

TABLE II-continued

| | Results of Testing | | | | | |
|---|---|---|---|---|---|---|
| | Thin Wall | | | Standard Wall | | |
| Example | Tensile (psi) | Elongation (%) | VW-1 (# test/ #pass) | Tensile (psi) | Elongation (%) | VW-1 (# test/ #pass) |
| 15 | 2120 | 430 | 10/10 | 1980 | 440 | 10/10 |
| 16 | 2100 | 430 | 10/10 | 1940 | 430 | 10/10 |

*Comparative Examples

It will be understood that the above-described embodiments are merely illustrative of applications of the principles or this invention and many other embodiments and modifications may be made without departing from the spirit and scope of the invention as defined in the claims.

What is claimed is:

1. A heat-recoverable article which passes a UL VW-1 flame test as defined in UL Standard for Safety for Extruded Insulating Tubing, UL 224, Fifth Edition, Dec. 15, 1999 and which comprises a polymeric composition which consists essentially of
   (a) 44 to 59% by weight of an ethylene copolymer comprising ethylene methyl acrylate,
   (b) 26 to 42% by weight of a first inorganic filler which comprises magnesium hydroxide,
   (c) 1 to 5% by weight of red amorphous phosphorus, and
   (d) 1 to 9% by weight of a second inorganic filler which comprises zinc borate; said article
   (1) having a tensile strength at 25° C. when recovered of at least 1500 psi; and
   (2) having an elongation to break at 25° C. when recovered of at least 200%, and
   (3) being in the form of a tube having a wall thickness of at most 1 mm (0.040 inch) when recovered.

2. An article according to claim 1 wherein the tube has an inner diameter.

3. An article according to claim 2 wherein the inner diameter is 3 to 9 mm.

4. An article according to claim 1 wherein the tensile strength is at least 1600 psi.

5. An article according to claim 1 wherein the elongation is at least 300%.

6. An article according to claim 1 wherein the composition further comprises polyethylene.

7. An article according to claim 1 wherein the wall thickness is less than 0.9 mm (0.035 inch) when recovered.

8. An article according to claim 7 wherein the wall thickness is less than 0.8 mm (0.030 inch) when recovered.

9. An article according to claim 8 wherein the wall thickness is less than 0.51 mm (0.020 inch) when recovered.

10. A non-halogenated heat-recoverable article which
    (1) comprises a polymeric composition which comprises
       (a) 44 to 59% by weight of an ethylene copolymer comprising ethylene methyl acrylate,
       (b) 26 to 42% by weight of a first inorganic filler which comprises magnesium hydroxide,
       (c) 1 to 5% by weight of red amorphous phosphorus with an average particle size of less than 50 µm, and
       (d) 1 to 9% by weight of a second inorganic filler which comprises a borate;
    (2) passes the UL VW-1 flame test as defined in UL Standard for Safety for Extruded Insulating Tubing, UL 224, Fifth Edition, Dec. 15, 1999;
    (3) has a tensile strength at 25° C. of at least 1500 psi when recovered;
    (4) has an elongation to break at 25° C. of at least 200% when recovered;
    (5) is in the form of a tube which has a wall thickness of at most 1 mm (0.040 inch) when recovered.

11. An article according to claim 10 wherein the borate is zinc borate.

12. An article according to claim 10 which has a wall thickness of 0.9 mm (0.035 inch) when recovered.

13. An article according to claim 12 which has a wall thickness of less than 0.8 mm (0.030 inch) when recovered.

14. An article according to claim 13 which has a wall thickness of less than 0.51 mm (0.020 inch) when recovered.

* * * * *